United States Patent
Dworak, Jr. et al.

(10) Patent No.: US 9,797,527 B2
(45) Date of Patent: Oct. 24, 2017

(54) PIPE RESTRAINT

(71) Applicant: Cooper Technologies Company, Houston, TX (US)

(72) Inventors: Dallas Martin Dworak, Jr., San Bernardino, CA (US); Troy William Schmidt, Riverside, CA (US); George Benedict Von Gnatensky, Fullerton, CA (US); Michael Tosunian, Brea, CA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/796,416

(22) Filed: Jul. 10, 2015

(65) Prior Publication Data

US 2016/0010764 A1 Jan. 14, 2016

Related U.S. Application Data

(60) Provisional application No. 62/023,769, filed on Jul. 11, 2014.

(51) Int. Cl.
| | |
|---|---|
| *F16L 3/12* | (2006.01) |
| *F16L 3/10* | (2006.01) |
| *F16L 3/24* | (2006.01) |
| *H02G 3/32* | (2006.01) |
| *A62C 35/68* | (2006.01) |
| *F24F 13/02* | (2006.01) |

(52) U.S. Cl.
CPC .......... *F16L 3/1058* (2013.01); *F16L 3/1215* (2013.01); *F16L 3/24* (2013.01); *H02G 3/32* (2013.01); *A62C 35/68* (2013.01); *F24F 13/0254* (2013.01)

(58) Field of Classification Search
CPC ............ F16L 3/1215; F16L 3/13; F16L 3/04; F16L 3/1075; F16L 3/1083; F16L 3/1058; F16L 3/24; H02G 3/32; A62C 35/68; F24F 13/0254
USPC ... 248/65, 67.7, 67.5, 68.1, 71, 73, 74.1, 74, 248/74.4, 74.3, 72, 229.1
See application file for complete search history.

(56) References Cited

U.S. PATENT DOCUMENTS

| | | | | |
|---|---|---|---|---|
| 766,028 | A * | 7/1904 | Fisher | F16B 2/10 |
| | | | | 248/230.1 |
| 853,040 | A * | 5/1907 | Taber | F16L 3/04 |
| | | | | 248/65 |
| 1,546,839 | A * | 7/1925 | Klingel | H01R 4/38 |
| | | | | 248/62 |

(Continued)

OTHER PUBLICATIONS

International Search Report and Written Opinion for PCT Application No. PCT/IB2015/055238, Oct. 28, 2015, 11 pages.

*Primary Examiner* — Kimberly Wood
(74) *Attorney, Agent, or Firm* — Senniger Powers LLP

(57) ABSTRACT

A pipe restraint device is disclosed. The pipe restraint device can include a pipe coupling portion to couple with a pipe to be restrained, and a support member coupling portion to couple with a support member extending from a building structure to support the pipe. The support member coupling portion can have a support member interface and a securing mechanism. The securing mechanism can be configured to exert a force on the support member to cause the support member to bear against the support member interface sufficient to secure the support member to the support member coupling portion.

13 Claims, 3 Drawing Sheets

(56) References Cited

U.S. PATENT DOCUMENTS

| | | | | |
|---|---|---|---|---|
| 1,854,478 | A * | 4/1932 | Meyers | A24F 19/0092 |
| | | | | 248/230.2 |
| 2,460,701 | A * | 2/1949 | Marshall | B01L 9/50 |
| | | | | 248/124.2 |
| 2,616,646 | A * | 11/1952 | Matthysse | F16L 3/1091 |
| | | | | 174/168 |
| 2,749,068 | A | 6/1956 | Wayman | |
| 3,006,231 | A * | 10/1961 | Kahn | F16B 5/0291 |
| | | | | 411/435 |
| 3,228,639 | A | 1/1966 | Korns | |
| 3,436,108 | A * | 4/1969 | Van Buren, Jr. | F16B 5/0685 |
| | | | | 24/336 |
| 3,789,724 | A * | 2/1974 | Moran | F16B 37/043 |
| | | | | 411/432 |
| 4,039,744 | A * | 8/1977 | Seaquist | H01B 17/18 |
| | | | | 174/169 |
| 4,264,048 | A | 4/1981 | Silbernagel | |
| 4,289,417 | A * | 9/1981 | Mandell | B25B 5/003 |
| | | | | 403/218 |
| 4,861,081 | A * | 8/1989 | Satoh | E05B 79/12 |
| | | | | 292/336.3 |
| 5,072,903 | A * | 12/1991 | Griffin | F16L 3/24 |
| | | | | 248/72 |
| 5,947,424 | A | 9/1999 | Heath | |
| 7,455,268 | B2 * | 11/2008 | Heath | F16L 3/1215 |
| | | | | 248/65 |
| 7,527,226 | B2 * | 5/2009 | Kusuda | G02B 6/4471 |
| | | | | 248/68.1 |
| 7,866,617 | B2 | 1/2011 | Kleitsch et al. | |
| 8,079,552 | B2 * | 12/2011 | Sweigard | F16L 3/1233 |
| | | | | 24/336 |
| 8,459,681 | B2 * | 6/2013 | Chamberlain | B62J 11/00 |
| | | | | 248/65 |
| 2013/0068900 | A1 | 3/2013 | Heath | |

* cited by examiner

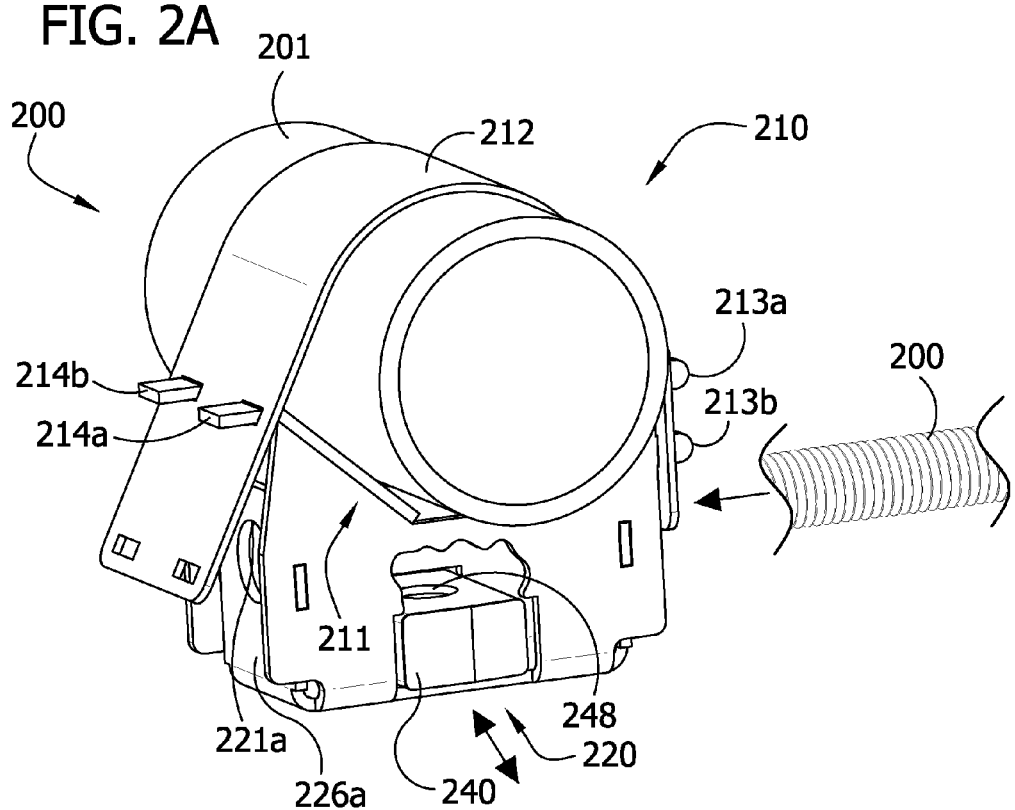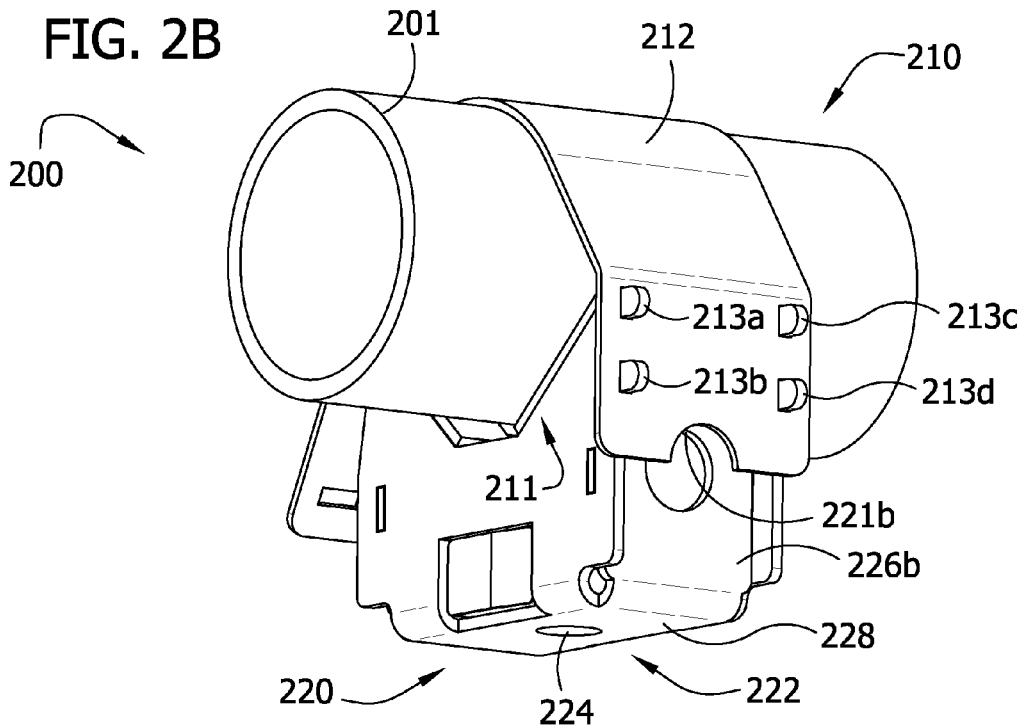

PIPE RESTRAINT

CROSS-REFERENCE TO RELATED APPLICATIONS

The present application claims the benefit of U.S. Provisional Application No. 62/023,769, filed Jul. 11, 2014, the entirety of which is incorporated by reference herein.

BACKGROUND

There are many products and assemblies used by construction, building, plumbing and electrical contractors and workers for bracing and supporting pipes, ducts, sprinkler systems, fans, air-conditioners, electrical cables, communication lines and other loads from ceilings, beams, studs, walls and floors. These products include clamps, braces, cables, hooks, straps, hangers, plates, and brackets, among other items. Many, however, are inefficient, require too many parts, or are too costly.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 2A is a perspective of a pipe restraint device in accordance with another example of the present disclosure, a portion of a wall of a pipe interface cut-away to reveal a block.

FIG. 2B is a bottom perspective of the pipe restraint device of FIG. 2A.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although many devices are commonly used in the industry for connection purposes in an installation, such devices can be difficult to install and can be expensive. Additionally, and undesirably, these devices may not be suited for reliably supporting or restraining against loads, such as in supporting a pipe, branch line, or other load suspended from a support structure, against undesirable sway, such as may be caused by seismic disturbances.

Accordingly, a pipe restraint device is disclosed that is simple to install and inexpensive. In one aspect, the pipe restraint device can facilitate adequate support of a pipe or branch line suspended from a support structure or upper restraint structure during a seismic event. The pipe restraint device can include a pipe coupling portion to couple with a pipe to be restrained, and a support member coupling portion to couple with a support member extending from a building structure to support the pipe. The support member coupling portion can have a support member interface and a securing mechanism. The securing mechanism can be configured to exert a force on the support member to cause the support member to bear against the support member interface sufficient to secure the support member to the support member coupling portion.

Figure 1A:
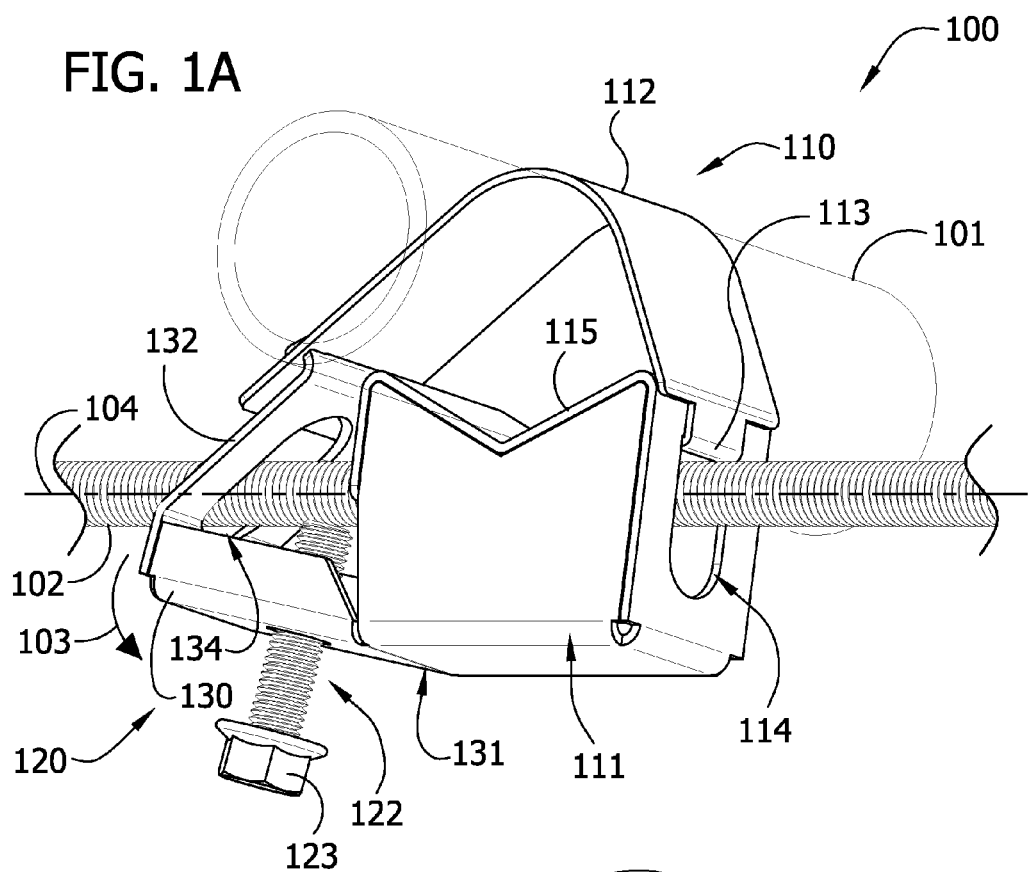
FIG. 1A is a bottom perspective of a pipe restraint device in accordance with an example of the present disclosure.

One example of a pipe restraint device 100 is illustrated in FIG. 1A. In some applications, the pipe restraint device 100 can be used to restrain a pipe 101, or conduit that may be used for the transport of utility fluids, for example, within or to a fire sprinkler system. For example, the pipe 101 can be a branch line and the pipe restraint device 100 can form a structural attachment component of a lower end of a branch line restraint or branch line restraint system for bracing against undesirable sway during seismic activities or disturbances. An upper branch line restraint (not shown) can be connected to a support structure such as a ceiling, wall, beam, or other suitable building structure. The upper and lower branch line restraints can both mate with and/or couple to a support member 102 and can form a branch line restraint system.

The pipe restraint device 100 can comprise a pipe coupling portion 110 to couple with the pipe 101. In one aspect, the pipe coupling portion 110 comprises a pipe clamp. The pipe coupling portion 110 can comprise a pipe interface 111 and a strap 112 configured to wrap around a portion of the pipe 101. The pipe interface 111 can comprise a saddle 115 having a V-shaped configuration to stably interface with the pipe 101. The strap 112 can be coupleable about the pipe interface 111 via a protrusion 113 formed about the strap 112, such as a hook, extending through an opening 114 formed in the pipe interface 111. In one aspect, the pipe coupling portion 110 can be configured to accommodate a plurality of pipe diameters.

The pipe restraint device 100 can also comprise a support member coupling portion 120 to couple with the support member 102 extending from a building or other structure (not shown) to support the pipe. The support member 102 can comprise a rod, a threaded rod, a pipe, a shaft, a beam, a strut, a bar, a conduit, a dowel, or other support members as will be recognized by those skilled in the art. In one aspect, the support member 102 can extend through the opening 114. In one aspect, the support member coupling portion 120 comprises a set screw, such as threaded fastener 123. The support member coupling portion 120 can have a support member interface 121 (shown in FIG. 1B), which can be associated with the pipe interface 111, and a securing mechanism 122, which can include a threaded fastener 123. The securing mechanism 122 can be configured to exert a force on the support member 102 to cause the support member 102 to bear against the support member interface 121 sufficient to secure the support member 102 to the support member coupling portion 120. In one aspect, the support member coupling portion 120 can be positionable along a longitudinal axis 104 of the support member 102.

In one aspect, exerting a force on the support member 102 can cause the strap 112 to tighten about the pipe 101. For example, the pipe restraint device 100 can include a pivot member 130 rotatable relative to the pipe interface 111, such as by way of a hinge or pivot connection 131. The pivot member 130 can be rotated upward to facilitate coupling of the pivot member 130 to a portion of the strap 112 and can be configured to adjustably support the securing mechanism 122. The pivot member 130, and the securing mechanism 122, can further comprise a hole formed therein to adjustably receive the threaded fastener 123. The pivot member 130 can be coupleable to the strap 112 via an extension member 132, which can have a hook 133 to interface with an opening of the strap 112, thereby securing the strap 112 to the pivot member 130. In one aspect, the pivot member 130 can have an opening 134 to receive the support member 102 and provide clearance for the support member 102 as the pivot member 130 rotates. In operation, subsequent forces exerted by the securing mechanism 122 on the support member 102 (e.g., by tightening the threaded fastener 123 against the support member 102) can cause the pivot support 130 to rotate in direction 103 (e.g., downward) and the strap 112 to tighten about the pipe 101. This will also cause the support member 102 to bear against the support member interface 121, thus securing the pipe restraint device 100 to the support member 102 and restraining the pipe 101. The pipe restraint device 100 can be adjusted to different positions about the support member 102.

FIGS. 2A-2C illustrate a pipe restraint device 200 in accordance with another example of the present disclosure. The pipe restraint device 200 shares some similarity with the pipe restraint device 100 of FIGS. 1A and 1B. For example, the pipe restraint device 200 includes a pipe coupling portion 210 that can have a pipe interface 211 and a strap 212 to wrap around a portion of a pipe 201. In this particular example, the strap 212 can be coupleable about the pipe interface 211 via protrusions 213a-d and 214a-b, such as tabs formed in the pipe interface 211, which are configured to be received through or inserted into respective openings formed in the strap 212.

Figure 1B:
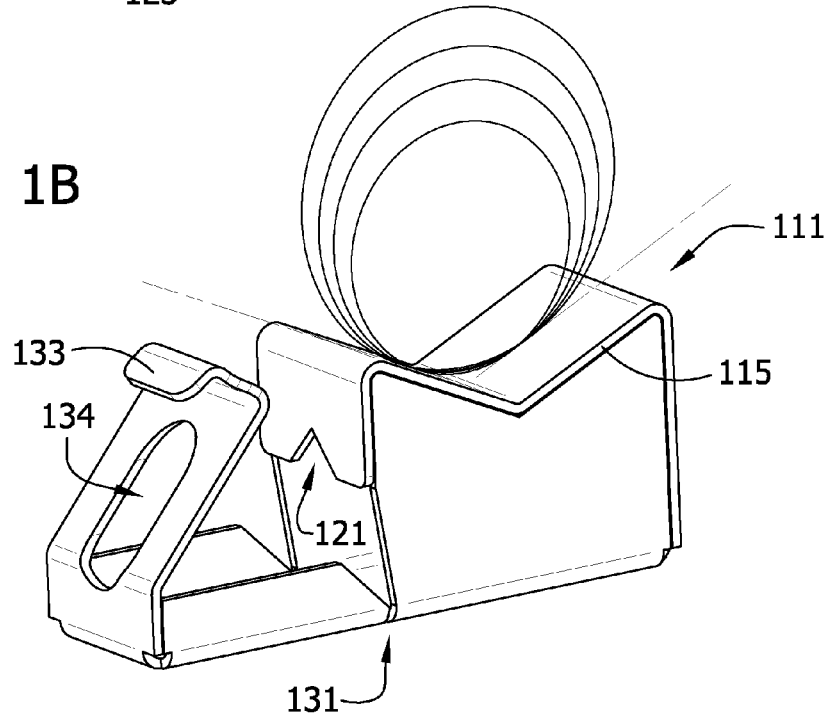
FIG. 1B is an isolated view of a portion of the pipe restraint device of FIG. 1A.

The pipe restraint device 200 can include a support member coupling portion 220 to couple with a support member, such as the support member shown in FIGS. 1A and 1B. The support member coupling portion 220 can comprise a support member interface 221a-b, which can be associated with the pipe interface 211, which support member interfaces 221a-b can be configured to receive a support member 202. In one example aspect, the support member interface 221a-b can comprise first and second openings formed in respective first and second tabs 226a-b extending upwards from a bottom plate 228 as part of the support member coupling portion 220. The support member interface 221a-b can be configured to receive and allow the support member 202 to pass there through.

The support member coupling portion 220 can further comprise a securing mechanism 222 configured to facilitate exertion of a force or load upon the support member 202. The securing mechanism 222 can comprise a threaded opening 224 formed in the bottom plate 228. The securing mechanism 222 can further comprise a block 240 having a threaded opening 248, wherein the block 240 can be supported within the pipe interface 211 and about the bottom plate 228. In one aspect, the block 240 can be removable, and configured to be removably received within the pipe interface 211. The opening 224 and the threaded opening 248 can be aligned and these configured to receive a threaded fastener (not shown, but similar to the threaded fastener discussed above). The threaded fastener can be inserted through the opening 224 and the threaded opening 248, and caused to exert a force upon the support member 202. In doing so, the support member 202 will be forced to bear against the support member interfaces 221a-b, thus coupling the pipe restraint device 200 to the support member, and restraining the pipe 201. In this case, a portion of the support member coupling portion 220 and the securing mechanism 222 can be associated with the pipe interface 211, such as coupled thereto or formed therewith.

Figure 3A:
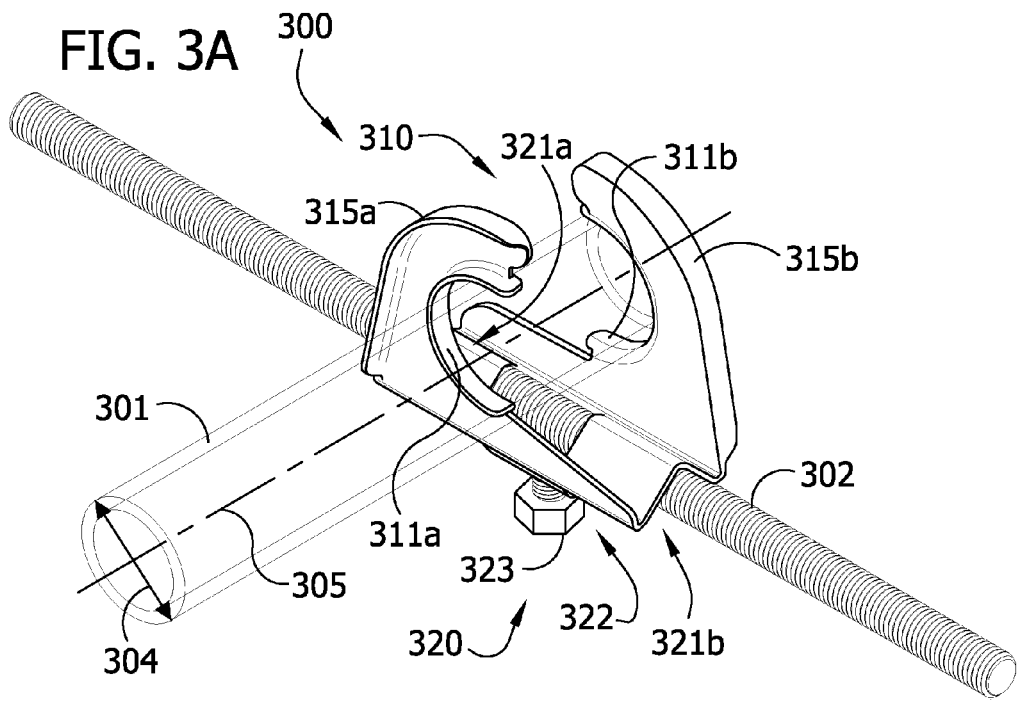
FIG. 3A is an example illustration of a pipe restraint device in accordance with yet another example of the present disclosure.
Figure 3B:
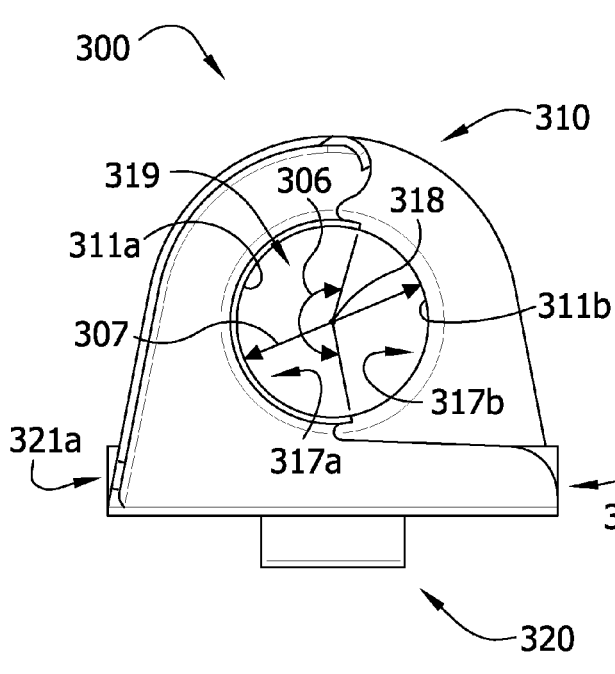
FIG. 3B is an end view of the pipe restraint device of FIG. 3A.
Figure 3C:
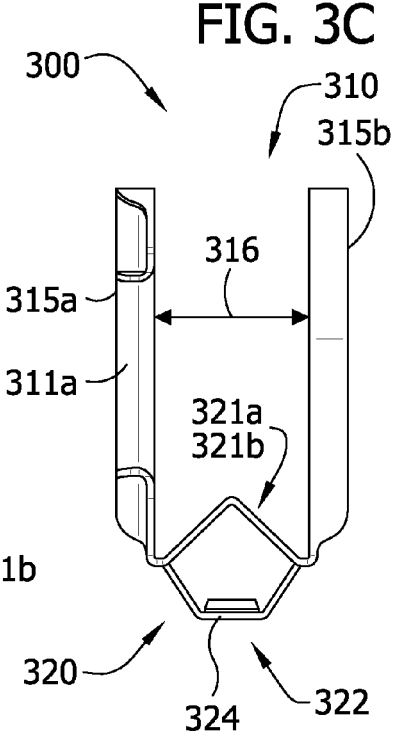
FIG. 3C is a side view of the pipe restraint device of FIG. 3A.

FIGS. 3A-3C illustrate a pipe restraint device 300 in accordance with yet another example of the present disclosure. The pipe restraint device 300 comprises a pipe coupling portion 310 including a pipe interface 311a-b, to couple with a pipe 301, and a support member coupling portion 320 to couple with a support member 302. The support member coupling portion 320 can have a support member interface 321a-b and a securing mechanism 322, which can include a threaded hole 324 and a threaded fastener 323. The support member interface 321a-b can comprise one or more restraint members that extend in opposing directions from one another, and which form an opening through which the support member 302 may pass. The threaded hole 324 can be formed in one of the restraint members.

In this case, the pipe coupling portion 310 can include a first extension 315a and a second extension 315b spaced from one another by a distance 316 that is greater than or substantially equal to a diameter 304 of the pipe 301. Each of the first and second extensions 315a, 315b can have a recess 317a, 317b on one side sized to receive about one-half of a cross-section of the pipe 301. The recesses of each extension can have a common center line 318. The extensions 315a, 315b can be configured such that the recesses 317a, 317b form a substantially full pipe opening 319, which can correspond to the pipe 301 cross-section, when viewed aligned with the common center line (e.g., circular), as shown in FIG. 3B. A diameter 307 of the pipe opening 319 can be substantially equal to the diameter 304 of the pipe 301, or greater. Thus, the pipe coupling portion 310 can be configured to be positioned relative to the pipe 301 with the pipe 301 extending between the first and second extensions 315a, 315b and generally perpendicular to the center line 318, such that rotating the pipe coupling portion 310 and/or the pipe 301 about 90° with respect to one another captures the pipe 301 in the full pipe opening 319 with the center line 318 substantially aligned with a longitudinal axis 305 of the pipe 301. In one aspect, the recesses 317a, 317b can have a generally semicircular shape. In another aspect, at least one of the recesses 317a, 317b can have an angular dimension 306 of greater than 180 degrees, thus facilitating the pipe 301 to essentially snap into place. In yet another aspect, the recesses can be formed by short generally semi-cylindrical portions that extend away from one another and that can be somewhat rounded on their ends so that sharp edges are not presented to the pipe when rotated into the desired position.

With the pipe 301 secured in place within the pipe coupling portion 310, the support member 302 can be received within the support member coupling portion 320. As the threaded fastener 323 is tightened, it can be caused to exert a force against the support member 302. Further tightening can cause the support member to subsequently bear against the support member interface 321a-b, thus securing the pipe restraint device 300 to the support member, and restraining the pipe 301.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pipe restraint device, comprising:
   a pipe coupling portion configured to couple with a pipe to be restrained, the pipe coupling portion including a first extension and a second extension spaced from one another by a transverse distance, each of the first and second extensions having a recess on one side sized to receive about one-half of a cross section of the pipe, the recesses of the first and second extensions having a common center line, wherein the first and second extensions are configured such that the recesses together form a substantially full pipe opening when viewed aligned with the common center line; and
   a support member coupling portion connected to the pipe coupling portion and configured to couple with an elongate support member extending from a building structure to support the pipe, the support member coupling portion including
      an upper coupling portion and a lower coupling portion disposed between and interconnecting the first and second extensions and together defining a support member opening having an axis extending transversely relative to the common center line and being sized and shaped to receive the elongate support member such that the elongate support member extends transversely relative to the common center line, wherein the upper coupling portion comprises two upper coupling portions spaced apart from one another axially along the axis of the support member opening and extending upward from the lower ends of the respective first and second extensions of the pipe coupling portion, wherein the lower coupling portion is disposed axially between the two upper coupling portions along the support member opening and extends downward from the lower ends of the first and second extensions of the pipe coupling portion, and
      a fastener secured to the lower coupling portion and configured to exert a securing force on the elongate support member received in the support member opening to cause the elongate support member to bear against the upper coupling portion to secure the elongate support member to the support member coupling portion.

2. The pipe restraint device of claim 1, wherein the support member coupling portion is slidable along a longitudinal axis of the elongate support member when the elongate support member is received in the support member opening and the fastener is not exerting the securing force on the elongate support member.

3. The pipe restraint device of claim 1, wherein the support member comprises a rod, a threaded rod, a pipe, a shaft, a beam, a strut, a bar, a conduit, a dowel, or combinations thereof.

4. The pipe restraint device of claim 1, wherein the fastener comprises a threaded fastener extending through the lower portion of the support member coupling portion into the support member opening and configured to exert the securing force on the elongate support member received in the support member opening to cause the elongate support member to bear against the upper coupling portion.

5. The pipe restraint device of claim 1, wherein the pipe coupling portion is configured to be positioned relative to the pipe with the pipe extending between the first and second extensions and generally perpendicular to the center line such that rotating at least one of the pipe coupling portion and the pipe about 90° with respect to one another captures the pipe in the full pipe opening with the common center line substantially aligned with a longitudinal axis of the pipe.

6. The pipe restraint device of claim 1, wherein each of the recesses have a generally semicircular shape.

7. The pipe restraint device of claim 1, wherein at least one of the recesses has an angular dimension of greater than 180 degrees.

8. The pipe restraint device of claim 1, wherein the pipe opening is circular.

9. The pipe restraint device of claim 1, wherein a diameter of the pipe opening is substantially equal to the diameter of the pipe.

10. A pipe restraint device, comprising:
a pipe coupling portion configured to couple with a pipe to be restrained, the pipe coupling portion including a first extension and a second extension spaced from one another by a transverse distance, each of the first and second extensions having a recess on one side sized to receive about one-half of a cross section of the pipe, the recesses of the first and second extensions having a common center line, wherein the first and second extensions are configured such that the recesses together form a substantially full pipe opening when viewed aligned with the common center line; and
a support member coupling portion disposed between and interconnecting the first and second extensions of the pipe coupling portion and configured to couple with an elongate support member extending from a building structure to support the pipe, the support member coupling portion including an upper coupling portion and a lower coupling portion together defining a support member opening having an axis extending transversely relative to the common center line and being sized and shaped to receive the elongate support member such that the elongate support member extends generally transversely relative to the common center line,
wherein the upper coupling portion comprises two upper coupling portions spaced apart from one another axially along the axis of the support member opening and extending upward from the lower ends of the respective first and second extensions of the pipe coupling portion,
wherein the lower coupling portion is disposed axially between the two upper coupling portions along the axis of the support member and extends downward from the lower ends of the first and second extensions of the pipe coupling portion,
wherein the lower coupling portion defines a fastener opening sized and shaped to receive a fastener to exert a securing force on the elongate support member received in the support member opening to cause the elongate support member to bear against the upper coupling portion to secure the elongate support member to the support member coupling portion.

11. The pipe restraint device of claim 10, wherein the fastener opening has a fastener axis extending transversely to the support axis of the support member opening.

12. The pipe restraint device of claim 10, further comprising a threaded said fastener received in the fastener opening.

13. The pipe restraint device of claim 12, further comprising the elongate support member received in the support member opening, wherein the elongate support member is secured to the support member coupling portion by the threaded fastener.

* * * * *